United States Patent
Masum-Thomas et al.

(10) Patent No.: US 6,466,363 B1
(45) Date of Patent: Oct. 15, 2002

(54) BROADBAND AMPLIFICATION WITH FIRST AND SECOND AMPLIFIERS HAVING DIFFERENT PUMP WAVELENGTH REQUIREMENTS

(75) Inventors: Jowan Masum-Thomas, Halstead; Rodolfo Di-Muro, Harlow, both of (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/671,863

(22) Filed: Sep. 27, 2000

(51) Int. Cl.$^7$ .................................................. H01S 3/00
(52) U.S. Cl. ...................................................... 359/334
(58) Field of Search .................. 372/70, 72; 359/337.1, 359/337.21, 337.4, 341.3, 341.31, 341.32, 341.33, 341.5, 334

(56) References Cited

U.S. PATENT DOCUMENTS

| | | | | |
|---|---|---|---|---|
| 5,883,736 A | * | 3/1999 | Oshima et al. | 359/341 |
| 5,991,069 A | * | 11/1999 | Jander | 359/337 |
| 6,002,697 A | * | 12/1999 | Govorkov et al. | 372/22 |
| 6,163,396 A | * | 12/2000 | Webb | 359/332 |
| 6,163,552 A | * | 12/2000 | Engelberth et al. | 372/3 |
| 6,330,104 B1 | * | 12/2001 | Kim et al. | 359/327 |

OTHER PUBLICATIONS

Kani et al., "Wideband and flat–gain optical amplification from 1460 to 1510nm by serial combinate of thulium–doped fluoride fiber amplifier and fiber Raman amplifier", Electronics Letters, Jun. 10, 1999, vol. 35, No. 12, pp. 1004–1006.*

Starodumov et al, "Upconversion in Tm3+–doped fluorozirconate fiber pumped by Raman laser", CLEO/Pacific Rim '99, pp. 471–472, vol. 2, Aug. 30–Sep. 3 1999.*

Percival et al., "Highly Efficient 1064nm upconversion pumped 1470nm thulium doped fluoride fiber amplifier", Electronics Letters, Sep. 29$^{th}$ 1994, vol. 30, No. 20, pp. 1684–1985.*

Bayart et al, "Broadband Optical Fiber Amplification Over 17.7 THz Range", Electronics Letters, Aug. 31$^{st}$ 2000, vol. 36, No. 18, pp. 1569–1571.*

* cited by examiner

Primary Examiner—Thomas H. Tarcza
Assistant Examiner—Deandra M. Hughes
(74) Attorney, Agent, or Firm—Lee, Mann, Smith, McWilliams Sweeney & Ohlson

(57) ABSTRACT

An optical amplifier comprises a pumped Thulium doped fiber amplifier and a Raman amplifier provided in series. The Thulium doped fiber amplifier provides gain over a first wavelength range, and is range is extended by the Raman amplifier by suitable pumping. The Thulium amplifier operates in the S band, but the wavelength range is extended to the C band by the Raman amplifier. The amplifier thus has increased bandwidth, thereby allowing it to be used in higher capacity optical communications systems.

13 Claims, 3 Drawing Sheets

BROADBAND AMPLIFICATION WITH FIRST AND SECOND AMPLIFIERS HAVING DIFFERENT PUMP WAVELENGTH REQUIREMENTS

This invention relates to optical amplifiers, and particularly to optical amplifiers for providing broadband amplification.

Various rare-earth doped optical amplifiers are known, such as Erbium or Erbium-Ytterbium doped fibers, and these are used to compensate for the fiber link and splitting losses within optical communications system. Pump light from a pump source is used to excite the dopant atoms in the fiber. Emission of energy from the excited atoms is stimulated by the incident signal, and this emission results in amplification of the signal.

The gain of rare-earth doped fibers as a function of the wavelength of the signal to be amplified typically includes a magnum gain in the form of a plateau, which provides the most useful operating region of the amplifier. It is desirable to provide a flat gain over the operating wavelength range, and various gain flattening filters are used for this purpose. However, the width of the plateau in the gain profile provides a limitation to the range of wavelengths for which the amplifier can be used, Different rare-earth dopants will provide different gain profiles, and amplifier arrangements have been proposed which place different types of amplifier in parallel, so that amplification across a broader wavelength range can be achieved. Wavelength-dependent optical splitting devices are required to implement this type of amplifier. Parallel connection of the amplifiers is required because signals outside the useful operating wavelength range of each amplifier need to bypass the amplifier, as the amplifiers are attenuating at wavelengths far enough outside their operating wavelength. The different amplifiers will have different pump requirements, and the need for different pump wavelength has in the past required multiple pump sources.

The characteristics of practical amplifiers have lead to the definition of three wavelength bans: the S band (1450 nm–1520 nm); the C band (1527 nm–1563 nm);and the L band (1570 nm–1603 nm). A 7 nm guard band is provided between the bands.

A Raman amplifier is another known amplifier configuration. This amplifier uses conventional fiber, which is may be co- or counter-purr to provide amplification over a wavelength range which is a function of the pump wavelength. The Ramnan amplifier relies upon forward or backward stimulated Raman scattering. Typically, the pump source is selected to have a wavelength of around 100 nm below the wavelength over which amplification is required. This type of amplifier has die advantage that it does not attenuate signals outside the wavelength range over which amplification takes place. However, high power pump sources are required, and it may be difficult in practice to implement pump sources of the required pump wavelength and power. The use of multiple Raman amplifiers at different wavelengths has also beau proposed, but this has in the past required multiple high power pump sources.

SUMMARY OF THE INVENTION

According to a first aspect of the invention, there is provided an optical amplifier arrangement comprising at least first and second pumped amplifiers, having different pump wavelength requirements, wherein a single pump source provides the pump light for the first and second amplifiers, at least one wavelength converting arrangement being provided for converting the pump source wavelength.

This arrangement enables a single pump source to provide multiple pump signals for different amplifiers. The amplifiers may comprise any combination of amplifiers with different pump requirements, for example the combination of a rare-earth doped amplifier and a Raman amplifier, or the combination of multiple Raman amplifiers.

The first amplifier may comprise a rare-earth doped amplifier, for example Thulium, and the second amplifier may comprise a Raman amplifier. Preferably, a splitter is provided for splitting the output of the pump source into two branches, one branch being provided as pump source to the first amplifier, and the second branch being provided to the wavelength converting arrangement, the output of the wavelength converting arrangement being provided as pump source to the second amplifier.

According to a second aspect of the invention, there is provided an optical amplifier comprising a pumped Thulium doped fiber amplifier and a Raman amplifier provided in series, the Thulium doped fiber amplifier having a maximum gain at a first wavelength, the Raman amplifier being pumped at a wavelength such that the Raman amplifier has a maximum gain adjacent the first wavelength, the amplifier thereby providing useful gain over a wavelength range which is broader than the range over which the Thulium amplifier provides useful gain.

This "useful gain" may be defined as the wavelength range over which the gain remains within a predetermined level compared to the maximum gain, for example the wavelength range over which the gain is within 3 dB of the gain.

The two amplifiers can be placed in series, as the Raman amplifier does not attenuate the gain provided by the Thulium amplifier, and this avoids the need for wavelength-selective splitters. The amplifier has increased bandwidth, thereby allowing it to be used in higher capacity optical communications systems. The Raman amplifier preferably is pumped to have a substantially flat gain spectrum above the wavelength range where there is useful gain provided by the Thulium amplifier. The Ramnan amplifier may then be pumped by a Raman laser providing a 1413 nm output. In this case, the Thulium amplifier operates in the S band, but the wavelength range is extended to the C band by the Raman amplifier.

Preferably, a single pump source provides the pump light for the Thulium doped amplifier and for the Raman amplifier. A wavelength converting arrangement is then provided for converting the pump source wavelength.

This reduces the number of components required to provide the pump signals. A splitter is preferably provided for dividing the pump source output into first and second outputs, the first output being provided as pump source for the Thulium doped amplifier and the second output being provided to the wavelength converting arrangement for supply to the Raman amplifier. The pump source may be a 1061 nm laser pump source, and the wavelength converting arrangement (a set of reflection Bragg gratings and a length of dispersion shifted fiber) increases the wavelength to 1413 nm.

The amplifier of the invention can be used in a wavelength division multiplex (WDM) optical communications system comprising a transmitter for generating signal radiation of wavelength in an operating wavelength range, a receiver for receiving for detecting the signal radiation, and an optical fiber link between the transmitter and the receiver. One or more of the optical amplifiers are provided in the link.

The invention also provides a method of designing a broadband optical amplifier.

BRIEF DESCRIPTION OF THE DRAWINGS

Examples of the invention will now be described in detail with reference to the accompanying drawings, in which.

DETAILED DESCRIPTION

Figure 1:
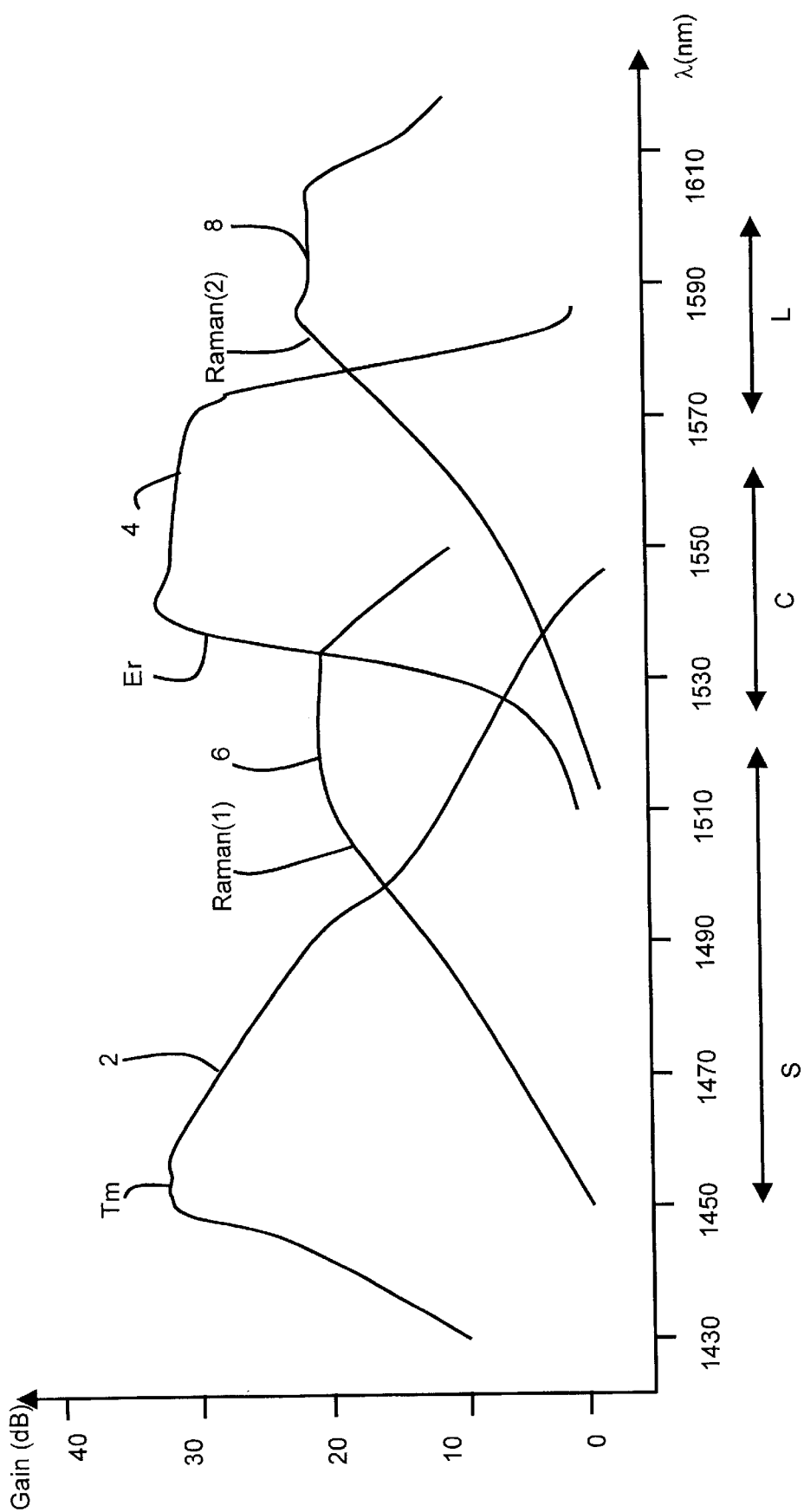
FIG. 1 shows schematically the gain performance of an Erbium doped amplifier, a Thulium doped amplifier and two Raman amplifiers with different pump wavelengths.

FIG. 1 shows the gain of various optical fiber amplifiers as a function of the wavelength of the signal to be amplified. The precise shape of each plot will be a function of the doping concentration and the length of the fiber used, as well as the power and spectral distribution of the pump radiation.

Plot 2 represents one possible gain response for a Thulium amplifier, which can provide a flat gain profile at the shorter region of the S-band. In particular, the gain profile has a maximum gain in the form of a substantially flat plateau, by which is meant a region of the gain spectrum in which the gain fluctuates by less than a given amount, for example 3 dB, and which covers a range of wavelengths, for example at least 15 nm.

Plot 4 represents one possible gain response for an Erbium amplifier, which can provide a flat gain profile across the C band.

Other rare-earth dopants may be used to provide useful amplification in other regions of the spectrum, and neodymium is a further example. These amplifiers attenuate signals outside the useful wavelength range, so signals which have significantly higher or lower wavelengths should not be allowed to propagate through the amplifier.

Plots 6 and 8 represent two possible gain responses for a Raman amplifier, the position of the profile along the x-axis being dependent principally on the pump wavelength used.

In one aspect, the invention takes advantage of the gain response of the Thulium amplifier in the lower region of the S band, and combines the Thulium doped fiber amplifier and a Raman amplifier in series. The Thulium doped fiber amplifier provides a region of useful gain (for example a gain plateau) over a first wavelength range at the low end of the S band, and this wavelength range is extended by the Raman amplifier. To achieve this, the Raman amplifier is pumped at a wavelength such that the Raman amplifier provides a useful gain spectrum immediately adjacent the first wavelength range.

Figure 2:
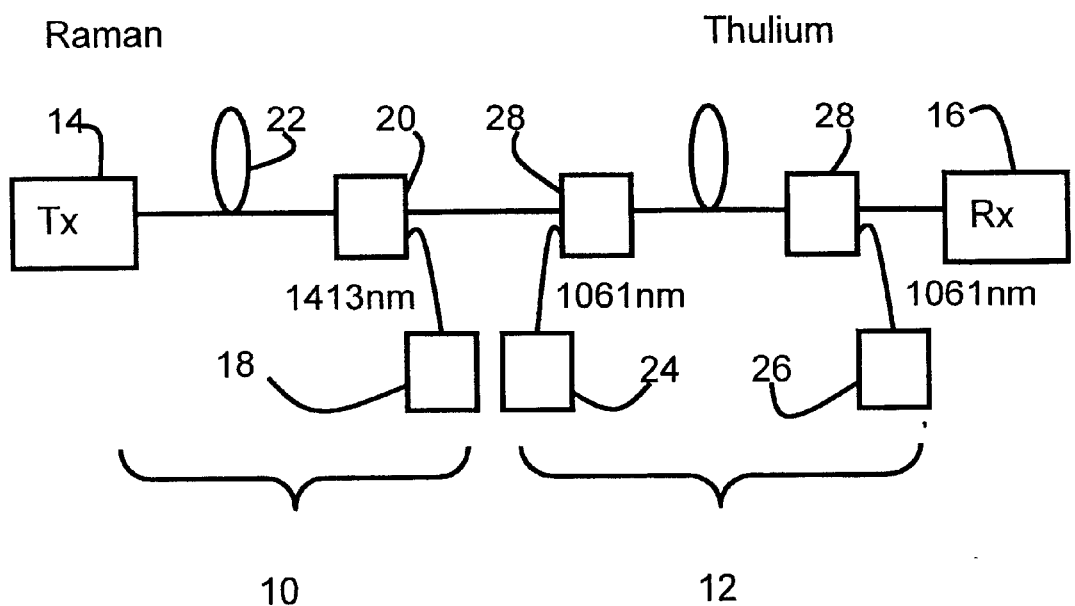
FIG. 2 shows an amplifier arrangement according to the invention.

FIG. 2 shows a first amplifier arrangement according to the invention, in which the Raman amplifier 10 is placed in series with the Thulium-doped amplifier 12, between a transmitter 14 and a receiver 16. The signals amplified by the arrangement will have components at a number of wavelengths, as defined by the ITU grid, and the amplifier provided broadband amplification.

The Raman amplifier is counter-pumped by a 1413 nm high power pump source 18 coupled into the signal path with an optical coupler 20. The pump power may need to be of the order of 1.2W, and a laser pump signal of 1413 nm is obtained by shifting the wavelength of a 1061 nm pump source using Raman conversions in a grating based laser. In such a device, 1061 nm pump light is coupled into a length of Dispersion shifted fiber, for example 2.5 km. Bragg gratings with very high reflectance maintain the light in the fiber loop until it has undergone a number of Raman shifts, for example 5 such shifts, up to 1413 nm. The last Bragg grating has a reflectance of 50%.

The Raman amplifier comprises a length 22 of non-zero dispersion shifted fiber, for example 10 km.

The Thulium amplifier 12 is co- and counter-pumped with 1061 nm pump light provided by pump sources 24, 26, coupled into the signal path using optical couplers 28. These only require a low pump power of approximately 200–400 mW. The thulium amplifier comprises a 10 m length of fluoride fiber with 2000 ppm (parts per million) thulium.

Figure 3:
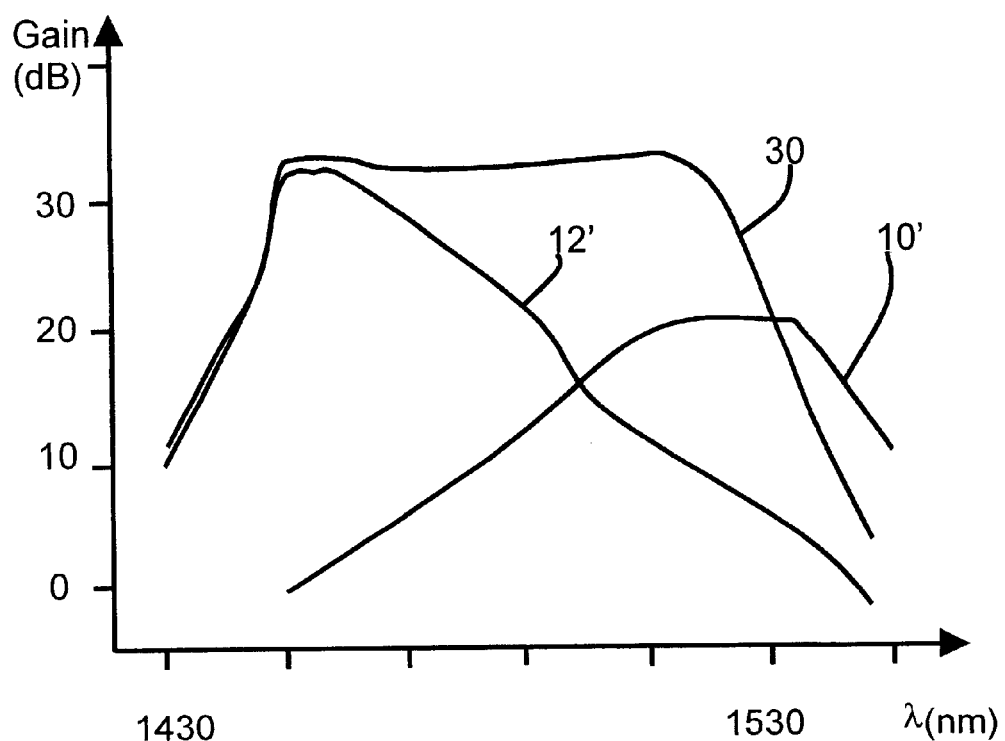
FIG. 3 shows the gain performance of the amplifier of FIG. 2.

FIG. 3 shows schematically the gain response of the individual amplifiers 10 (plot 10') and 12 (plot 12') and the gain characteristics 30 of the combined series amplifier. As shown, the series amplifier provided a broader plateau in the gain response, which enables useful gain to be provided over the fill S-band. Essentially, the Raman amplifier is tuned to extend the amplification bandwidth of the thulium amplifier.

Figure 4A:
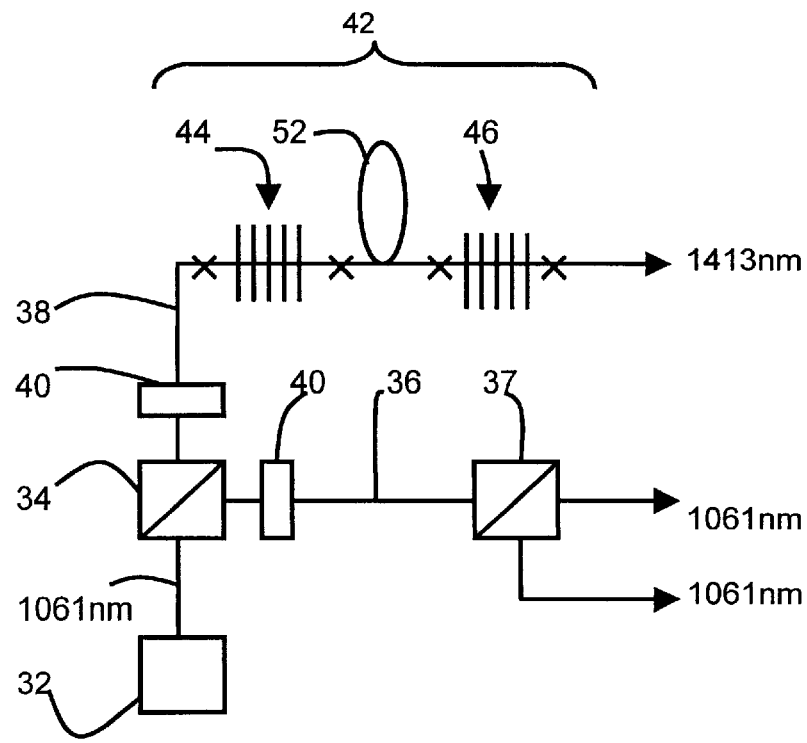
FIGS. 4A and 4B show two possible pump source arrangements for the Thulium and Raman amplifiers

FIG. 4A shows a pump source arrangement according to the invention for the Thulium and Raman amplifiers, to provide the pump source wavelengths shown in FIG. 2. The arrangement includes a single pump source 32 providing a 1061 nm output. A splitter 34 provides first and second paths 36, 38. The first path 36 receives a proportion of the power of the pump source 32 which is appropriate for pumping of the Thulium amplifier for each of the co- and counter-pumps). The first path 36 may have a further 50:50 splitter 37 to provide co- and counter-pump sources.

The appropriate power levels may be provided at the output of the splitter 34 by means of attenuators 40.

Figure 4B:
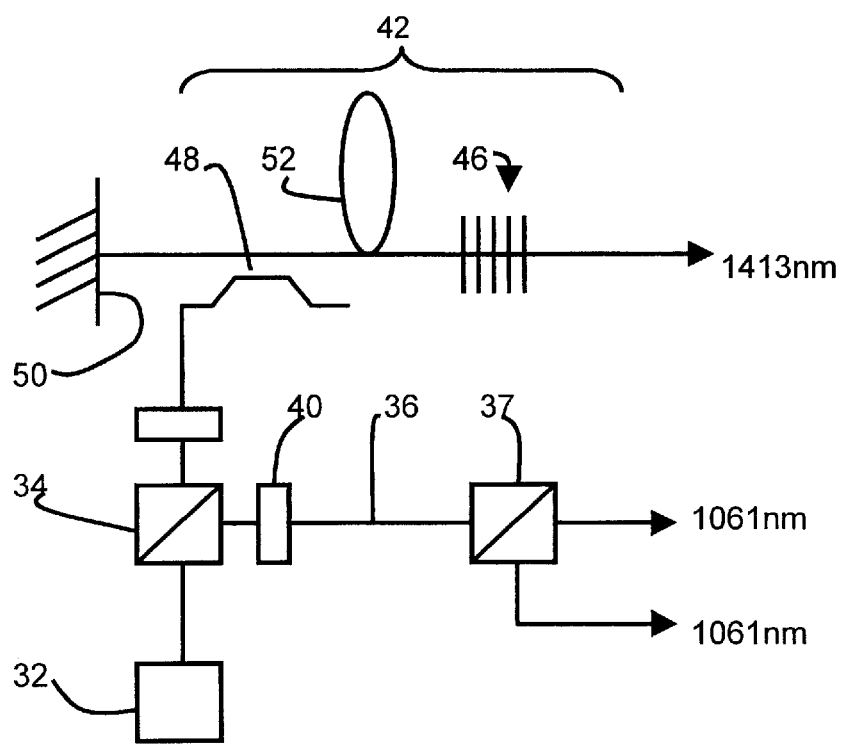

The second path 38 is provided to a wavelength converter 42 in the form of two sets of fiber gratings 44, 46, The first set of gratings 44 may instead comprise a coupler and 48 a reflector 50 as shown in FIG. 4B, so that a single set of gratings 46 is required. In either case, the 1061 nm pump light is coupled into DSP fiber 52. As mentioned above, the Bragg gratings have very high reflectance and maintain the light in the loop until it has undergone the appropriate number of Raman shifts, up to 1413 nm.

This pump source arrangement reduces the number of components required to provide all the required pump signals.

Although one specific configuration has been shown, it will be understood that the Raman amplifier and the Thulium amplifier may be co- and/or counter-pumped.

For example, the pumping scheme for the Thulium doped amplifier will be selected to be appropriate for the intended use of the amplifier. Thulium amplifiers may be pumped with pump light in tube wavelen range 1040–1210 nm, for example 1047 nm. This may be counter-pumping only. When co- and counter-pumped, the pump wavelength may also differ, and the invention again enables a single pump source to be used for the co- and counter-pumping and for the other (Raman) amplifier. The co-pumping may be at 1200 nm and b counter-pumping may be at 1060 or 1047 nm.

The exact pump wavelength for the Raman amplifier will be selected as a function of the desired gain response.

Gain flattening in the amplifier of the invention can be achieved by pump power adjustment in the two amplifiers, and this can avoid the need for a gain flattening filter. The series connection avoids the need for wavelength-selective filters and can also enable the guard band to be used for transmission of data.

In the specific example above, a pump wavelength of 1061 nm has been described, whereas it should be understood that the same laser diode configuration may result in a pump wavelength a range of, for example, 1060–1065 nm. Similarly, all other specific values of pump wavelg are by way of example only.

The common pump feature has been described only in connection with the specific example of a Thulium and Raman amplifier combination. However, the pump source arrangement may be adapted for use with any amplifier arrangement having a combination of pump requirements, for example in an Erbium—Raman amplifier combination or a multiple Raman amplifier configuration.

What is claimed is:

1. An optical amplifier arrangement comprising at least first and second pumped amplifiers, having different pump wavelength requirements, wherein a single pump source provides the pump light for the first and second amplifiers, at least one wavelength converting arrangement being provided for converting the pump source wavelength.

2. An arrangement according to claim 1, wherein the first amplifier comprises a rare-earth doped amplifier and the second amplifier comprises a Raman amplifier.

3. An arrangement according to claim 2, wherein the rear-earth doped amplifier comprises a Thulium doped amplifier.

4. An arrangement according to claim 1, wherein the pump source has an output wavelength of approximately 1060 nm.

5. An arrangement according to claim 1, wherein a splitter is provided for splitting the output of the pump source into two branches, one branch being provided as pump source to the first amplifier, and the second branch being provided to the wavelength converting arrangement, the output of the wavelength converting arrangement being provided as pump source to the second amplifier.

6. An optical amplifier comprising a pumped Thulium doped fiber amplifier and a Raman amplifier provided in series, the Thulium doped fiber amplifier having a maximum gain at a first wavelength, the Raman amplifier being pumped at a wavelength such that the Raman amplifier has a maximum gain adjacent the first wavelength, the amplifier thereby providing useful gain over a wavelength range which is broader than the range over which the Thulium amplifier provides useful gain, wherein a single pump source provides the pump light for the Thulium doped amplifier and for the Raman amplifier, and wherein a wavelength converting arrangement is provided for converting the pump source wavelength.

7. An amplifier according to claim 6, wherein the Raman amplifier has a maximum gain at a wavelength above the first wavelength.

8. An amplifier according to claim 7, wherein the Raman amplifier is pumped by a fiber laser with wavelength below 1450 nm.

9. An amplifier according to claim 8, wherein the Raman amplifier is pumped by a fiber laser with wavelength between 1390 and 1430 nm.

10. An amplifier according to claim 9, wherein the Raman amplifier is pumped by a Raman laser providing approximately 1413 nm output.

11. An amplifier according to claim 6, wherein a splitter is provided.

12. An amplifier according to claim 11, wherein the pump source is a laser pump source of wavelength around 1061 mn, and the wavelen converting arrangement increase the wavelength to 1390–1430 nm.

13. An amplifier according to claim 12, wherein the wavelength converting arrangement comprises a set of reflection Bragg gratings and a length of dispersion shifted fiber.

* * * * *